US009520725B2

(12) United States Patent
Masaoka et al.

(10) Patent No.: US 9,520,725 B2
(45) Date of Patent: Dec. 13, 2016

(54) WIRELESS POWER TRANSFER SYSTEM, TRANSMISSION DEVICE, AND CONTROLLING METHOD OF WIRELESS POWER TRANSFER SYSTEM

(75) Inventors: Shinya Masaoka, Hiroshima (JP); Katsuhiko Mito, Hiroshima (JP); Akira Hirano, Hiroshima (JP); Norihiro Okubo, Hiroshima (JP); Masaki Naito, Hiroshima (JP); Yasunori Takeuchi, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 407 days.

(21) Appl. No.: 14/369,096

(22) PCT Filed: Dec. 27, 2011

(86) PCT No.: PCT/JP2011/080237
§ 371 (c)(1),
(2), (4) Date: Jun. 26, 2014

(87) PCT Pub. No.: WO2013/098947
PCT Pub. Date: Jul. 4, 2013

(65) Prior Publication Data
US 2014/0327323 A1 Nov. 6, 2014

(51) Int. Cl.
*H02J 5/00* (2016.01)
*H02J 17/00* (2006.01)

(52) U.S. Cl.
CPC .............. *H02J 5/005* (2013.01); *H02J 17/00* (2013.01)

(58) Field of Classification Search
None
See application file for complete search history.

(56) References Cited

U.S. PATENT DOCUMENTS 6,967,462 B1 11/2005 Landis
2008/0265087 A1 10/2008 Quinn et al.
(Continued)

FOREIGN PATENT DOCUMENTS

JP 2004-184078 A 7/2004
JP 2005-351877 A 12/2005
(Continued)

OTHER PUBLICATIONS

Office Action in corresponding Korean Patent Application No. 10-2014-7018753 dated Apr. 14, 2016, with translation (9 pages).
(Continued)

*Primary Examiner* — Rexford Barnie
*Assistant Examiner* — Swarna N Chowdhuri
(74) *Attorney, Agent, or Firm* — Osha Liang LLP

(57) ABSTRACT

A wireless power transfer system includes a power receiving device that receives transmission by wireless power transfer, a transmission device that has a transmission element that transmits transmission power to the power receiving device, the transmission device having a control mechanism that controls an oriented direction of the transmission element, and a positioning device that is connected communicably with the transmission device, the positioning device receiving with a plurality of antennas arranged adjacent to each other a positioning signal that is a wireless signal transmitted from the power receiving device, the positioning device having a positioning function that calculates a direction α in which the power receiving device exists when seen from the positioning device itself and a position of the power receiving device, based on a phase difference between the received positioning signals.

9 Claims, 8 Drawing Sheets

(56) References Cited

U.S. PATENT DOCUMENTS

| | | | |
|---|---|---|---|
| 2009/0243394 A1 | 10/2009 | Levine | |
| 2009/0254766 A1* | 10/2009 | Yamasuge | H04W 8/30 |
| | | | 713/300 |
| 2010/0033021 A1 | 2/2010 | Bennett | |
| 2011/0175455 A1 | 7/2011 | Hashiguchi | |

FOREIGN PATENT DOCUMENTS

| | | | |
|---|---|---|---|
| JP | 2005-351878 A | 12/2005 | |
| JP | 2006-023261 A | 1/2006 | |
| JP | 2009-253762 A | 10/2009 | |
| JP | 2010-284006 A | 12/2010 | |
| JP | 2011-147280 A | 7/2011 | |
| WO | 95/11828 A1 | 5/1995 | |
| WO | 2008/156571 A2 | 12/2008 | |
| WO | WO 2008156571 A2 * | 12/2008 | H02J 17/00 |

OTHER PUBLICATIONS

Notification of Transmittal of Translation of the International Preliminary Report on Patentability in corresponding PCT Application No. PCT/JP2011/080237, mailed Jul. 10, 2014. (1 page).
International Preliminary Report on Patentability in corresponding PCT Application No. PCT/JP2011/080237, mailed Jul. 1, 2014 (1 page).
English translation of Written Opinion of the International Searching Authority issued in PCT/JP2011/080237 mailed on Apr. 3, 2012 (3 pages).
Extended European Search Report in counterpart European Application No. 11878826.4 issued Jun. 2, 2015 (6 pages).
Office Action in counterpart Chinese Patent Application No. 201180076046.6 issued on Jan. 12, 2016 (13 pages).
International Search Report issued in PCT/JP2011/080237 mailed on Apr. 3, 2012 (3 pages).
Written Opinion issued in PCT/JP2011/080237 mailed on Apr. 3, 2012 (3 pages).
Notification of Reasons for Rejection issued in Japanese Application No. 2012-524968 mailed on Sep. 4, 2012 (8 pages).
Decision of Final Rejection issued in Japanese Application No. 2012-524968 mailed on Nov. 13, 2012 (3 pages).
Office Action issued in corresponding Chinese Appication No. 201180076046.6 dated Sep. 6, 2016, and English translation thereof (8 pages).

* cited by examiner

WIRELESS POWER TRANSFER SYSTEM, TRANSMISSION DEVICE, AND CONTROLLING METHOD OF WIRELESS POWER TRANSFER SYSTEM

CROSS-REFERENCE TO RELATED APPLICATIONS

The present application is a national stage application of PCT/JP2011/080237 filed Dec. 27, 2011. The priority application is hereby incorporated by reference in its entirety.

TECHNICAL FIELD

The present invention generally relates to wireless power transfer systems, transmission devices, and controlling methods of wireless power transfer systems, and relates in particular to a technique to efficiently and surely perform wireless power transfer.

BACKGROUND

Patent Literature 1 describes a wireless power transfer system having a power transmission device that transmits power that is to be transmitted and a power receiving device that receives power from the power transmission device, the power transmission device includes a first resonant element that transmits power with a magnetic field resonance relationship, the power receiving device includes a second resonant element that receives power that is transmitted from the power transmitting device with a magnetic field resonance relationship, the power transmission device having a drive section that can adjust at least one of an arrangement angle and an arrangement position of the first resonant element, in accordance with power transmission information of at least one of the power transmission device and the power receiving device.

CITATION LIST

Patent Literature

[PTL 1] Japanese Patent Laid-open Publication No. 2011-147280

Recently, the need for wireless power transfer is increasing due to widespread use of such as portable electric devices and electric vehicles and practical use of transmission over long distances based on such as electromagnetic field resonance techniques is progressing. Thus, in realization of wireless power transfer over long distances, it is necessary to ensure transmission efficiency of transmission power from the transmission device to the power receiving device as much as possible and to make sure that wireless power transmission is performed efficiently and surely.

SUMMARY OF THE INVENTION

One or more embodiments of the present invention provide a wireless power transfer system, a transmission device, and a wireless power transfer system, which can efficiently and surely perform wireless transfer.

In one aspect, one or more embodiments of the present invention may be a wireless power transfer system including: a power receiving device that receives transmission by wireless power transfer; a transmission device that has a transmission element that transmits transmission power to the power receiving device, the transmission device having a control mechanism that controls an oriented direction of the transmission element; a positioning device that is connected communicably with the transmission device, the positioning device receiving with a plurality of antennas arranged adjacent to each other a positioning signal that is a wireless signal transmitted from the power receiving device, the positioning device having a positioning function that calculates a direction α in which the power receiving device seen from the positioning device itself exists and a position of the power receiving device, based on a phase difference between the received positioning signals, wherein the transmission device acquires from the positioning device a direction α in which the power receiving device exists, controls the control mechanism so that the oriented direction of the transmission element faces the direction of the power receiving device based on the acquired direction α and starts transmission, and acquires a distance between the transmission device itself and the power receiving device based on the position of the power receiving device acquired from the positioning device, and obtains a permissible range of transmission efficiency at the time of transmitting the transmission power to the power receiving device, which corresponds to the acquired distance, the power receiving device transmits to the transmission device a power value that is currently being supplied from the transmission device, the transmission device receives the power value sent from the power receiving device, obtains a current transmission efficiency, based on the received power value and a power value of the transmission power currently being transmitted from the transmission element, and in the case that the current transmission efficiency deviates from the permissible range, acquires again from the positioning device a direction α in which the power receiving device exists, and based on the acquired direction α, controls the oriented direction of the transmission element so that the oriented direction of the transmission element faces the direction of the power receiving device.

According to one or more embodiments of the invention, based on a direction α in which the power receiving device exists, acquired with the positioning device, the transmission device may perform control so that the oriented direction of the transmission element faces the direction of the power receiving device and starts transmission, and obtain a permissible range of transmission efficiency, which corresponds to the distance between the transmission device and the power receiving device acquired with the positioning device, obtain a current transmission efficiency from the power value received from the power receiving device and a power value being output from the transmission element, and in the case that the obtained transmission efficiency deviates from the permissible range, acquire again a direction α, and based on the re-acquired direction α, perform control so that the oriented direction of the transmission element faces the direction of the power receiving device. Thus, the oriented direction of the transmission element can, for example, be appropriately controlled and the transmission from the transmission device to the power receiving device can be efficiently and surely performed.

In another aspect, one or more embodiments of the invention may be a wireless power transfer system, wherein in the case that the transmission efficiency deviates from the permissible range, the transmission device stops the transmission to the power receiving device, acquires again from the positioning device the direction α in which the power receiving device exists, performs control so that the oriented direction of the transmission element faces the direction of the power receiving device, based on the direction α in which the acquired power receiving device exists, and subsequently restarts the transmission to the power receiving device.

According to one or more embodiments of the invention, in the case that the transmission efficiency deviates from the permissible range, the transmission device stops the transmission, therefore inefficient transmission can be prevented from being performed. The transmission device restarts the transmission after adjusting the oriented direction, thus the transmission from the transmission device to the power receiving device can be performed efficiently and surely.

In another aspect, one or more embodiments of the invention may be a wireless power transfer system, wherein the transmission device transmits to the power receiving device a positioning signal transmitting request that is information requesting transmitting of the positioning signal in respect to the power receiving device, the positioning device performs positioning of the power receiving device based on the positioning signal that the power receiving device transmits according to the positioning signal transmitting request, and the transmission device transmits the positioning signal transmitting request during performing the transmission to the power receiving device, and after transmitting the positioning signal transmitting request, in the case that the positioning device does not receive the positioning signal from the power receiving device within a predetermined time, the transmission device stops the transmission to the power receiving device.

According to one or more embodiments of the invention, the transmission device may transmit the positioning signal transmitting request at the time of performing the transmission to the power receiving device, and subsequently, in the case that the positioning device does not receive the positioning signal from the power receiving device within a predetermined time, the transmission device may stop the transmission to the power receiving device. In this way in the case that the positioning signal could not be received the transmission is stopped, therefore transmission with a large loss can be prevented from being performed.

In another aspect, one or more embodiments of the invention may be a wireless power transfer system, wherein the power receiving device includes a power receiving element that receives the transmission power and a control mechanism that controls an oriented direction of the power receiving element, the transmission device transmits to the power receiving device the direction α in which the power receiving element acquired from the positioning device exists and a position where the power receiving device exists, the power receiving device receives the direction α and the position, and adjusts the oriented direction of the power receiving element to a direction of the transmission device based on the received direction α and the position.

According to one or more embodiments of the invention, the power receiving device may also adjust the oriented direction of the power receiving element to a direction of the transmission device, based on the result of positioning sent from the transmission device, thus transmission efficiency can be improved.

In another aspect, one or more embodiments of the invention may be a wireless power transfer system, wherein the transmission device supplies by wireless power transfer to the power receiving device power needed to adjust the oriented direction of the power receiving device.

According to one or more embodiments of the invention, the transmission device may supply by wireless power transfer to the power receiving device power needed to adjust the oriented direction of the power receiving element.

Therefore, in the case that the power receiving device does not have an accumulating capability, adjustment of the oriented direction of the power receiving element can be performed.

Other features of the invention will become clear with reference to modes to carry out one or more of the embodiments of the invention and the drawings.

According to one of more embodiments of the invention, transmission to the power receiving device can be efficiently and surely performed. Furthermore, one of ordinary skill in the art would appreciate that certain "sections" or "devices" of one or more embodiments of the present invention can include or be implemented by a processor or circuit.

DESCRIPTION OF EMBODIMENTS

Below, modes to carry out one or more embodiments of the invention are described with reference to the drawings.

Figure 1:
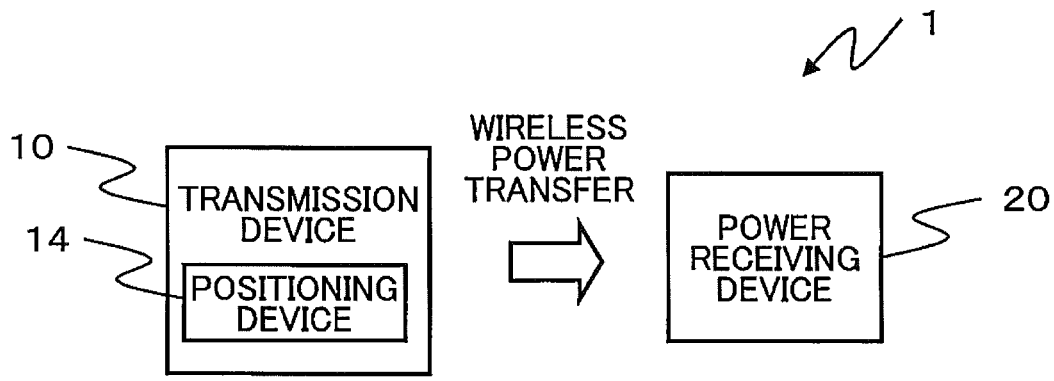
FIG. 1 describes a configuration of a wireless power transfer system 1 according to one or more embodiments of the invention.

FIG. 1 describes a schematic configuration of a wireless power transfer system 1 that will be explained as examples of a first embodiment. In the drawing, the wireless power transfer system 1 is configured having a power transmission device 10 including a positioning device 14, and a power receiving device 20 that receives transmission from the transmission device 10 by wireless power transfer. The power receiving device 20 is, for example, a portable phone, a portable terminal, a compact house appliance, an electric vehicle, and the like. The transmission device 10 is provided in, for example, an environment where the power receiving device 20 exists, an environment where a user with the power receiving device 20 comes and goes, and an environment which a large number of unspecified users can access.

Figure 2:
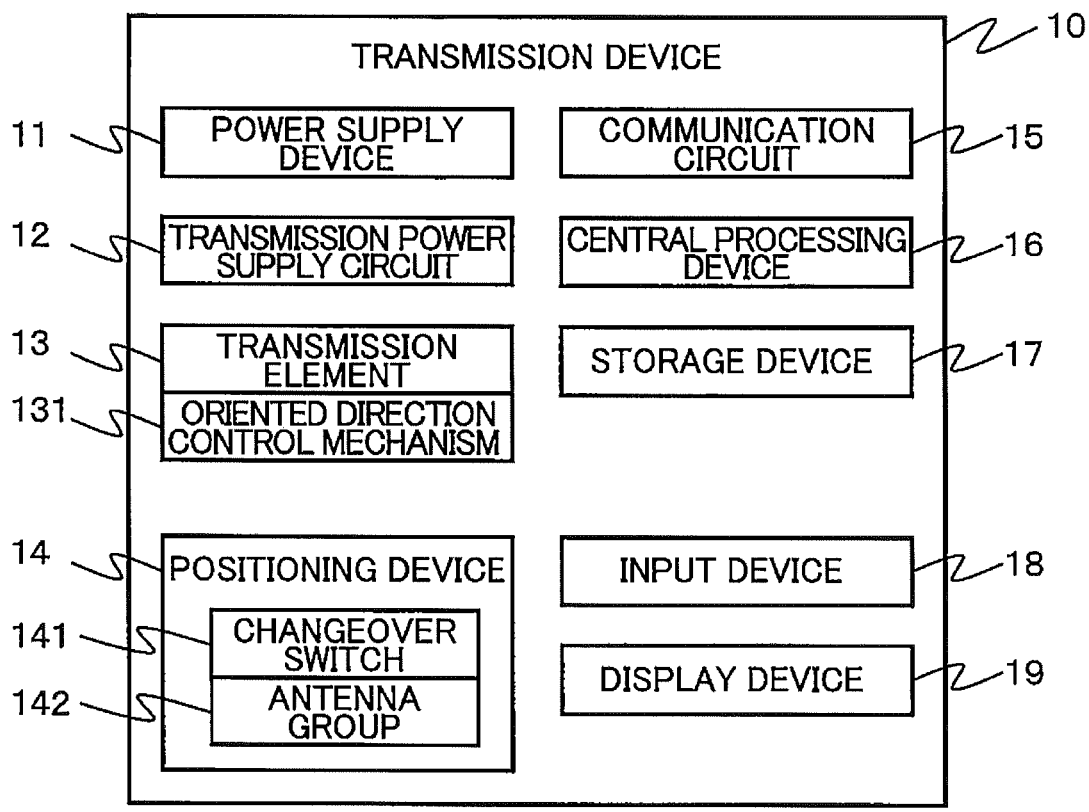
FIG. 2 describes a hardware configuration of a transmission device 10 according to one or more embodiments of the invention.

FIG. 2 shows a hardware configuration of the transmission device 10. As shown in the figure, the transmission device 10 includes a power supply device 11, a transmission power supply circuit 12, a transmission element 13, an oriented direction control mechanism 131, a positioning device 14, a communication circuit 15, a central processing device 16, a storage device 17, an input device 18, and a display device 19. Note that, the positioning device 14 may be configured in an integrated manner with the transmission device 10, or may be configured separately from the transmission device 10.

The power supply device 11 is, for example, a switching or a linear power supply, and supplies power to drive the configuring elements of the transmission device 10.

The transmission power supply circuit 12 has a driver circuit (a gate driver, a half-bridge driver and the like), and generates a drive current of a predetermined frequency that is supplied to the transmission device 13, based on the power supplied from the power supply device 11.

The transmission element 13 is an inductive element such as a coil in the case where the above wireless power transfer is performed in a magnetic field method (magnetic field coupling method, magnetic field resonance method), and is a capacitive element such as a capacitor in the case where the above wireless power transfer is performed in an electric field method (electric field coupling method, electric field resonance method), and is an antenna in the case where the above wireless power transfer is performed in an electromagnetic wave method.

The oriented direction control mechanism 131 is configured with such as a support section that supports the transmission element 13 in three axes directions rotatably and a servomotor that controls the oriented direction of the transmission element 13.

The positioning device 14 has a changeover switch 141 and an antenna group 142 and receives from the power receiving device 20 a wireless signal (below referred to as a positioning signal) relating to positioning to be described later.

The communication circuit 15 communicates with the power receiving device 20 (for example, by wireless LAN (LAN:Local Area Network), a wireless method of IEEE standard 802.15.1, a wireless method of IEEE standard 802.15.4). Communication between the transmission device 10 and the power receiving device 20 can be performed by such as modulating (modulation) a transmission signal, namely by including information to be transmitted in the transmission signal.

The central processing device 16 is configured with such as a CPU or an MPU. The central processing device 16 performs an overall control of the transmission device 10. The storage device 17 is configured with such as a RAM, ROM, NVRAM and stores program and data. The input device 18 is a touch panel, a numeric keypad, and the like. The display device 19 is a liquid crystal display and the like.

Figure 3:
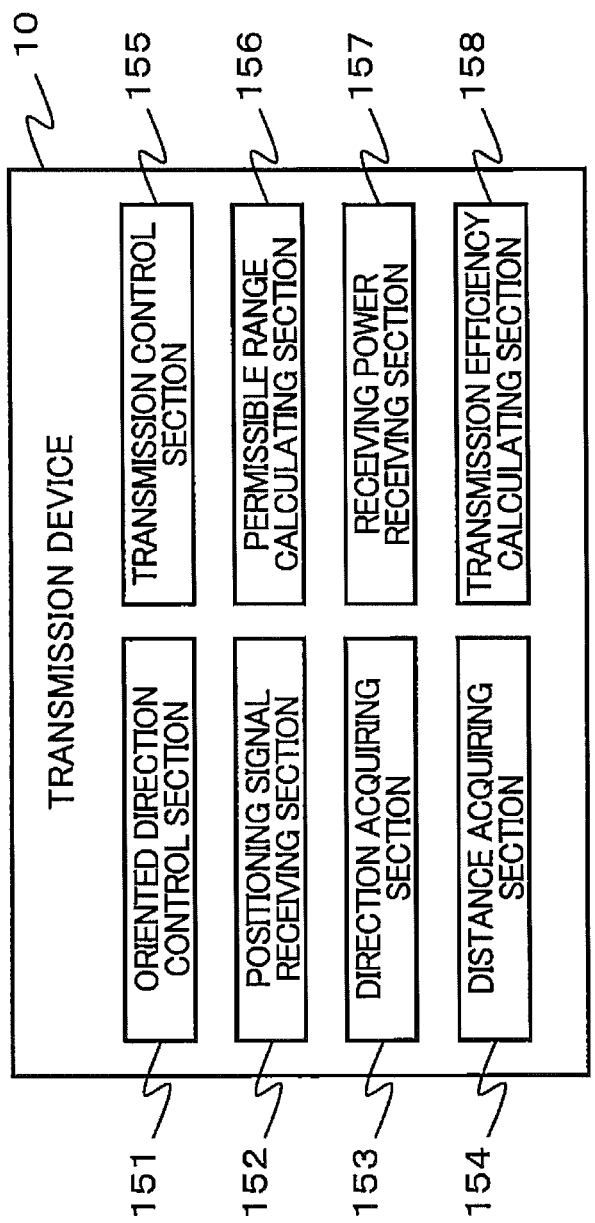
FIG. 3 describes main functions of the transmission device 10 according to one or more embodiments of the invention.

FIG. 3 shows the main functions of the transmission device 10. As shown in the figure, the transmission device 10 has an oriented direction controlling section 151, a positioning signal receiving section 152, a direction acquiring section 153, a distance acquiring section 154, a transmission controlling section 155, a permissible range calculating section 156, a receiving power receiving section 157, and a transmission efficiency calculating section 158. These functions are realized with hardware of the transmission device 10, or with the central processing device 16 of the transmission device 10 reading and executing a program stored in the storage device 17.

The oriented direction controlling section 151 controls the oriented direction of the transmission element 13 with the oriented direction control mechanism 131.

The positioning signal receiving section 152 receives a wireless signal transmitted from the power receiving device 20 (positioning signal) with the antenna group 142.

The direction acquiring section 153 acquires a direction in which the power receiving device 20 exists when seen from the transmission device 10 (hereinbelow, referred to as direction α), which was calculated with the positioning function, to be described later, of the positioning device 14.

The distance acquiring section 154 acquires the distance between itself and the power receiving device 20, which was calculated with the positioning function, to be described later, of the positioning device 14.

The transmission controlling section 155 controls power transmitted from the transmission element 13.

The permissible range calculating section 156 determines a permissible range of transmission efficiency when performing power supply to the power receiving device 20, which corresponds to a distance acquired with the distance acquiring section 154. Details of the calculating method of the permissible range will be described later.

The receiving power receiving section 157 receives the power value of power currently being received with the power receiving device 20 from the transmission device 10, which is transmitted from the power receiving device 20.

The transmission efficiency calculating section 158 acquires from the transmission element 13 the power value of power currently being output from the transmission element 13, and based on the acquired power value and the power value that the receiving power receiving section 157 has received from the power receiving device 20, calculates the current transmission efficiency regarding transmission of transmission power from the transmission device 10 to the power receiving device 20.

Figure 4:
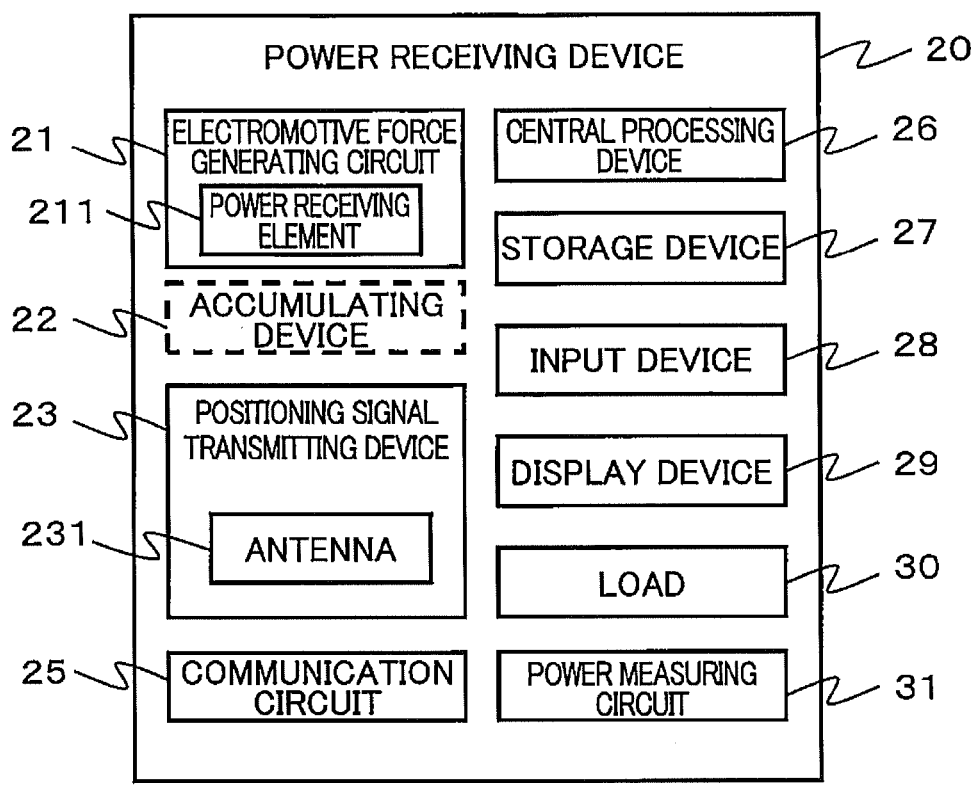
FIG. 4 describes a hardware configuration of a power receiving device 20 according to one or more embodiments of the invention.

FIG. 4 shows a hardware configuration of the power receiving device 20. AS shown in the figure, the power receiving device 20 includes an electromotive force generating circuit 21, an accumulating device 22, a positioning signal transmitting device 23, a communication circuit 25, a central processing device 26, a storage device 27, an input device 28, a display device 29, a load 30, and a power measurement circuit 31.

The electromotive force generating circuit 21 is configured with a power receiving element 211 such as a power receiving coil and the like. The electromotive force generating circuit 21 generates electromotive force with energy from the electromagnetic field sent from the transmission device 10.

The accumulating device 22 includes an accumulator battery such as a secondary battery (such as a lithium-ion battery, a lithium polymer battery, a nickel metal hydride battery, a nickel-cadmium battery) and a capacitative element (such as an electrical double-layer capacitor), a rectifying circuit that supplies a current based on an electromotive force generated with the electromotive force generating circuit 21, a smoothing circuit, and a transmission circuit such as a DC/AC converter and a DC/DC converter. Note that, the power receiving device 20 does not necessarily have to have the accumulating device 22. For example, the power receiving device 20 may be configured to directly supply a current based on the electromotive force generated with the electromotive force generating circuit 21 to the load 30.

The positioning signal transmitting device 23 includes a transmitting circuit of a positioning signal and an antenna 231 that transmits the positioning signal as will be described later on.

The communication circuit 25 performs communication with the transmission device 10 by a wireless method or a wired method.

The central processing device 26 is configured with such as a CPU or an MPU, and performs a centralized control of the power receiving device 20.

The storage device 27 is configured with such as a RAM, a ROM and a NVRAM, and stores programs and data. The input device 28 is such as a keyboard and a touch panel. The display device 29 is such as a liquid crystal panel.

The load 30 is, for example, in a case where the power receiving device 20 is a cellular telephone, a circuit (a receiving circuit, a transmitting circuit and the like) of the cellular telephone. The power measuring circuit 31 measures a power value currently being supplied from the transmission device 10.

Figure 5:
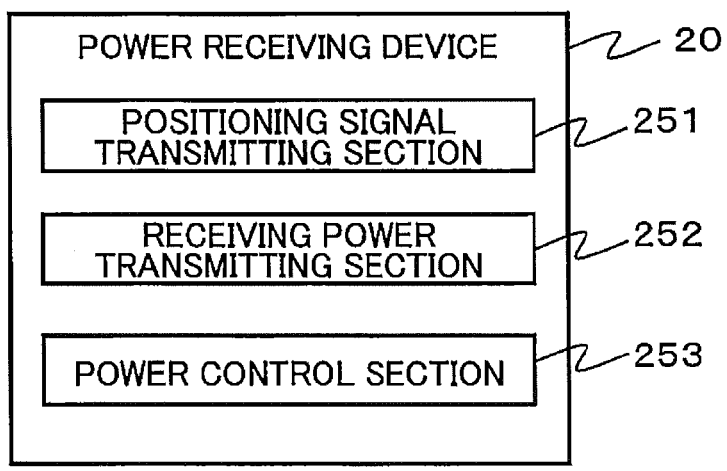
FIG. 5 describes main functions of the power receiving device 20 according to one or more embodiments of the invention.

FIG. 5 shows main functions of the power receiving device 20. As shown in the drawing, the power receiving device 20 includes a positioning signal transmitting section 251, a receiving power transmitting section 252, and a power control section 253. The functions of the above are achieved by hardware of the power receiving device 20, or by the central processing device 26 of the power receiving device 20 reading and executing programs stored in the storage device 27.

The positioning signal transmitting section 251 controls the positioning signal transmitting device 23 and transmits the positioning signal from the antenna 231.

The receiving power transmitting section 252 transmits to the transmission device 10 the power value measured with the power measurement circuit 31, namely the power value of transmission that the power receiving device 20 is currently receiving from the transmission device 10.

The power control section 253 controls supply of power generated with the electromotive force generating circuit 21 to the accumulating device 22 and the load 30.

<Mechanism of Positioning>

Next, the mechanism of positioning is explained. The transmission device 10 receives the positioning signal 600 formed of a wireless signal that is a spread spectrum, which is sent from the antenna 231 of the power receiving device 20, while periodically switching between the plurality of antennas configuring the antenna group 142.

Figure 6:
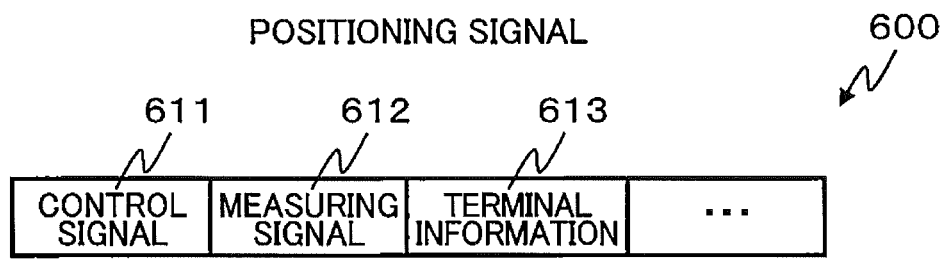
FIG. 6 shows data format of a positioning signal 600 according to one or more embodiments of the invention.

FIG. 6 is an example of a data format of the positioning signal 600 which is transmitted from the power receiving device 20. As shown in the drawing, the positioning signal 600 includes signals and information such as a control signal 611, a measuring signal 612, and terminal information 613.

The control signal 611 includes modulated waves and various control signals. The measured signal 612 includes nonmodulated waves of approximately several msec (for example, signals used for detection of a direction that the power receiving device 20 is in in respect to the transmission device 10 and a relative distance of the power receiving device 20 in respect to the transmission device 10 (for example, a spread code of a 2048 chip)). The terminal information 613 includes an identifier that is attached uniquely to each power receiving device 20 (below, referred to as a power receiving device ID).

Figure 7:
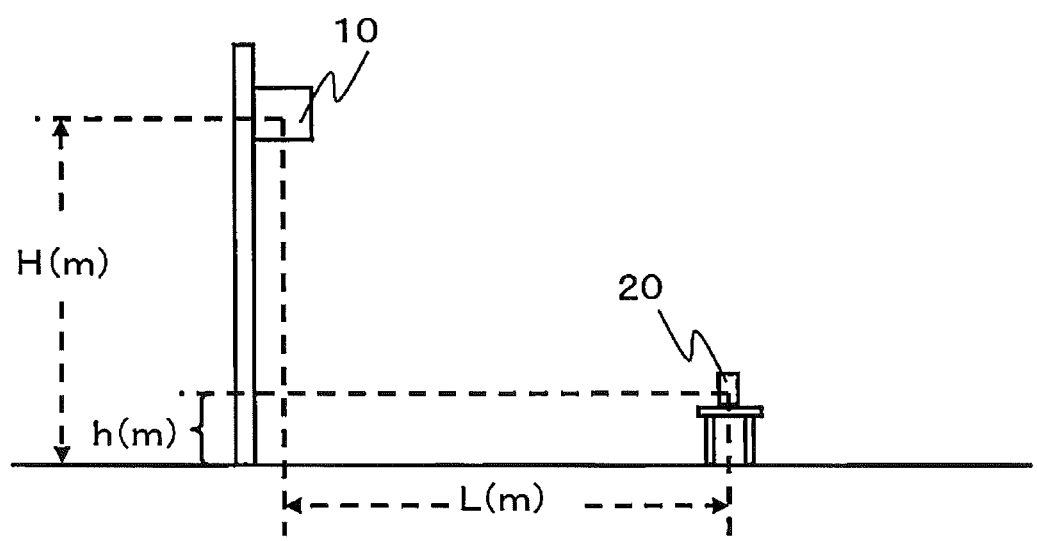
FIG. 7 describes a positional relationship (how a variable is decided showing a height and a distance) between the transmission device 10 and the power receiving device 20 according to one or more embodiments of the invention.

FIG. 7 indicates a positional relationship (how a variable showing a height and a distance is decided) of the transmission device 10 and the power receiving device 20. In this example, the power receiving device 20 is in a position above the ground by h(m), and the transmission device 10 is fixed to a position above the ground by H(m). A straight distance from directly below the transmission device 10 to the power receiving device 20 is L(m).

Figure 8:
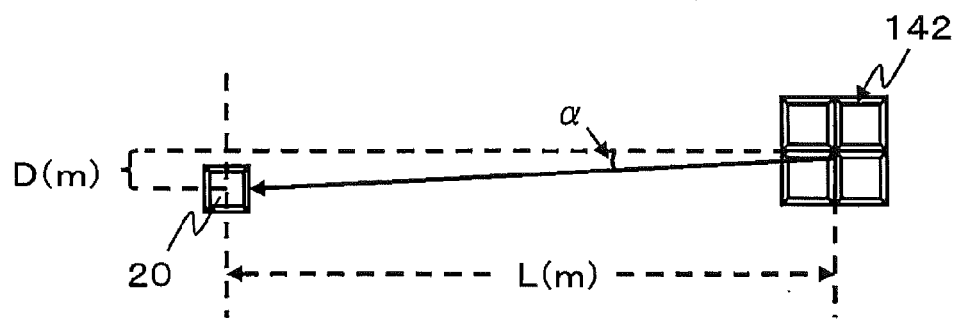
FIG. 8 describes a positional relationship between antennas configuring an antenna group 142 and the power receiving device 20 according to one or more embodiments of the invention.

FIG. 8 is a diagram explaining the positional relationship between a plurality of antennas configuring the antenna group 142 of the transmission device 10 and the power receiving device 20. As shown in the figure, in this example, the antenna group 142 is configured with four circular polarized directional antennas arranged adjacent to each other in equal intervals in a two-dimensional plane in a substantially square shape in an interval of one wavelength or less of the positioning signal 600 (for example, in a case that the positioning signal 600 is a radio wave of a 2.4 GHz band, an interval of equal to or less than one wavelength (12.5 cm)).

In this drawing, if an angle between a horizontal direction in a height position of the antenna group 142 and a direction of the power receiving device 20 in respect to the antenna group 142 is a, for example, the relationship is as follows:

$$\alpha = \arctan(D(m)/L(m)) = \arcsin(\Delta L(cm)/6(cm))$$

Note that, $\Delta L$(cm) is a difference in length of transmission paths between two specific antennas, of the antennas configuring the antenna group 142, and the power receiving device 20.

Here, in a case a phase difference of the positioning signals 600 received by two specific antennas configuring the antenna group 142 is $\Delta \theta$, there is the relationship as follows:

$$\Delta L(cm) = \Delta \theta / (2\pi/\lambda(cm))$$

Further, as the positioning signals 600, for example, in a case of using a radio wave of a 2.4 GHz band, $\lambda \approx 12$ (cm), therefore there is the relationship of $$\alpha = \arcsin(\Delta \theta / \pi)$$

Further, in a measurable range $(-\pi/2 < \Delta \theta < \pi/2)$, $\alpha = \Delta \theta$ (radian), and thus from the above equation a direction which the transmission device 10 is in can be specified.

Figure 9:
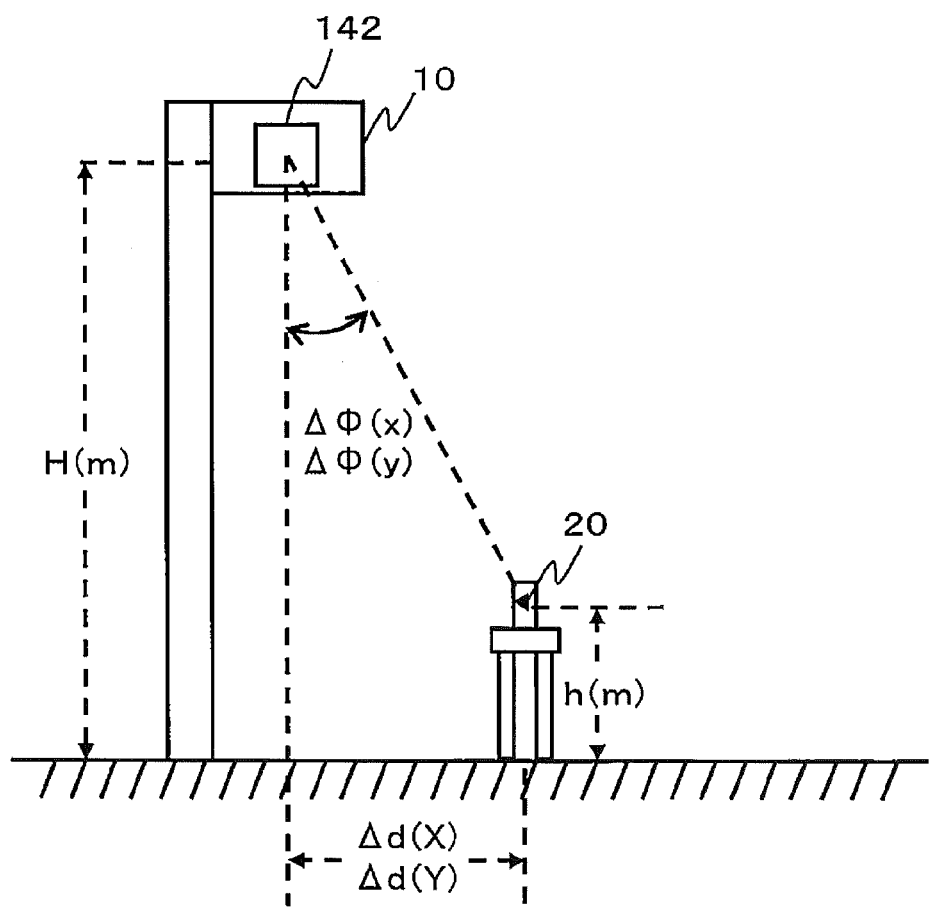
FIG. 9 shows a positional relationship (how a variable is decided showing a height, a distance, and an angle) between the transmission device 10 and the power receiving device 20 according to one or more embodiments of the invention.

FIG. 9 shows a positional relationship (how a variable showing a height, a distance, and an angle is decided) of the transmission device 10 and the power receiving device 20 in a location installed with the transmission device 10. As shown in the drawing, when the height from the ground of the antenna group 142 of the transmission device 10 is H(m), the height from the ground of the power receiving device 20 is h(m), in a case a position of a ground surface directly below the transmission device 10 is an origin and rectangular coordinate axes (x-axis, y-axis) are set, an angle between the direction from the transmission device 10 to the power receiving device 20 and the x axis is $\Delta \phi(x)$ and an angle between the direction from the transmission device 10 to the power receiving device 20 and the y axis is $\Delta \phi(y)$, then the position of the power receiving device 20 in respect to the origin can be obtained from the following equation.

$$\Delta d(x) = (H-h) \times \tan \Delta \phi(x)$$

$$\Delta d(y) = (H-h) \times \tan \Delta \phi(y)$$

Then, when the position of the origin is (X1, Y1), the current position of the power receiving device 20 (Xx, Yy) can be obtained from the following equation.

$$Xx = X1 + \Delta d(x)$$

$$Yy = Y1 + \Delta d(y)$$

The methods of positioning explained above are also explained in detail in for example, Japanese Patent Laid-open Application No. 2004-184078, Japanese Patent Laid-open Application No. 2005-351877, Japanese Patent Laid-open Application No. 2005-351878, and Japanese Patent Laid-open Application No. 2006-23261.

Note that, positioning of the power receiving device 20 may be performed by sending the positioning signal 600 from the power receiving device 20, receiving this with the transmission device 10 and performing positioning of the power receiving device 20, or the positioning signal 600 can be transmitted from the transmission device 10, the power receiving device 20 can receive the positioning signal 600 and perform positioning at the power receiving device 20 side and transmit the results to the transmission device 10. In this embodiment the former method is used.

<Process Explanation>

Next, processes performed by the transmission device 10 and the power receiving device 20 (hereinbelow, referred to as transmission process S1000) when wireless power transfer is to be carried out with the wireless power transfer system 1 configured as above are described with reference to flowcharts shown in FIGS. 10 and 11.

Figure 10:
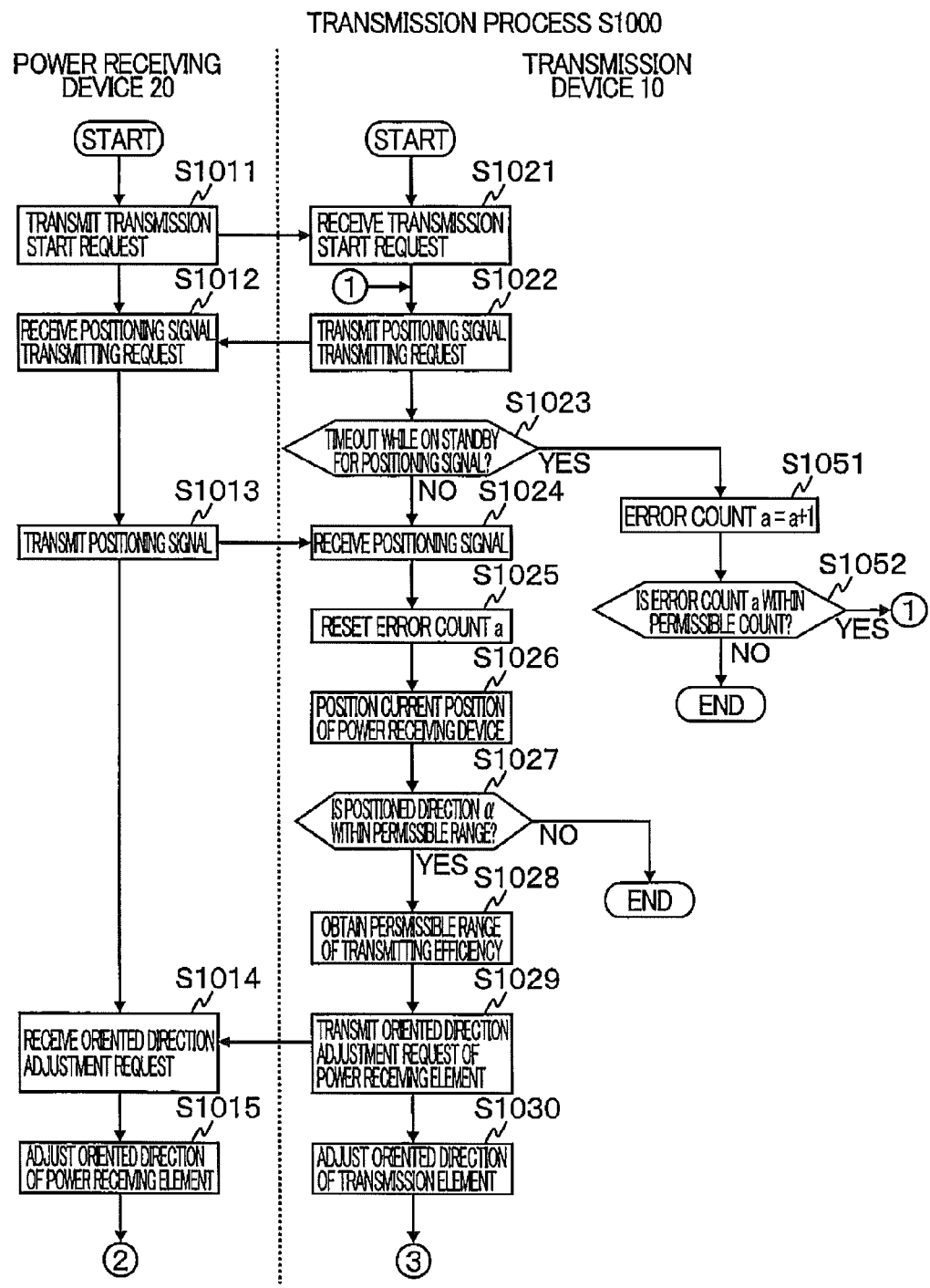
FIG. 10 is a flowchart describing a transmission process S1000 according to one or more embodiments of the invention.

As shown in FIG. 10, first the power receiving device 20 transmits a transmission start request to the transmission device 10 (S1011). When the transmission device 10 receives the transmission start request from the power receiving device 20 (S1021), the transmission device 10 transmits the transmission request of the positioning signal 600 to the power receiving device 20 (S1022).

When the power receiving device 20 receives the positioning signal transmitting request (S1012), the power receiving device 20 transmits the positioning signal 600 (S1013).

Note that, after the transmission device 10 transmits the positioning signal transmitting request in S1022, the transmission device 10 is on standby to receive the positioning signal 600 during a predetermined time (S1023), and in the case that the positioning signal 600 could not be received within the predetermined time (in the case of time out) (S1023:YES), 1 is added to an error count a (S1051).

Further, in the case that the error count a exceeds a permissible count (the permissible count already set regarding error count a) (S1052:NO), the transmission device 10 terminates standby of the positioning signal 600 from the power receiving device 20, and then the transmission process S1000 ends. Note that, in the case that transmission is being carried out to the power receiving device 20 due to a process in S1035 to be described later, the transmission is stopped and then the transmission process S1000 ends.

Note that, as a case that the error count a exceeds the permissible count, namely a case that the positioning signal 600 cannot be received from the power receiving device 20, there is a case where some kind of fault is occurring in the power receiving device 20 or a case where after the power receiving device 20 has transmitted the transmission start request (S1011), the power receiving device 20 has moved to a location apart from the transmission device 10.

When the transmission device 10 receives the positioning signal 600 transmitted from the power receiving device 20 (S1024) the error count a is reset (S1025), and based on the received positioning signal 600, positions the direction α in which the power receiving device 20 exists and the current position of the power receiving device 20 (S1026).

Next, the transmission device 10 decides whether or not the positioned direction α is within the permissible range (S1027). In the case that the positioned direction α is within the permissible range (S1027: YES), the process proceeds to S1028, and in the case the direction α is outside the permissible range (S1027:NO), the process ends or returns to S1022 (in the case where the power receiving device 20 has moved, the direction α may be within the permissible range in the next positioning).

In S1028, the transmission device 10 obtains a permissible range of transmission efficiency corresponding to a distance obtained from the current position of the power receiving device 20 that has been acquired. This permissible range is obtained as follows, for example.

First, a maximum transmission efficiency (ηmax) is obtained from the following equation, based on a multiplied value S of a value Q and a coupling coefficient (k) between the transmission device 10 and the power receiving device 20.

$$\eta max = ((1+S^2)^{(1/2)} \times (S^2))/(((1+(1+S^2)^{(1/2)}) \times (S^2)) + ((1+(1+S^2)^{(1/2)})^2))$$

Next, the maximum transmission efficiency ηmax obtained with the above equation is multiplied with a predetermined ratio (for example, a ratio determined based on an error generated when calculating the direction α, an error generated when calculating a distance between the transmission device 10 and the power receiving device 20, a measurement accuracy of the power measuring circuit 31, atmospheric pressure, temperature, and the like), and such result becomes the permissible range of transmission efficiency.

Next, the transmission device 10 transmits to the power receiving device 20 the direction α in which the power receiving device 20 positioned in S1026 exists, the current position of the power receiving device 20, and also a request instructing adjustment of the oriented direction of the power receiving element 211 of the power receiving device 20 (hereinbelow, referred to also as oriented direction adjusting request) (S1029). Note that, such as in the case that the power receiving device 20 does not have an accumulation capability, and in the case that the power receiving device 20 needs power required to adjust the oriented direction, power needed to adjust the oriented direction may be supplied by wireless power transfer from the transmission device 10 to the power receiving device 20.

When the power receiving device 20 receives the oriented direction adjustment request (S1014), based on the direction α in which the power receiving device 20 exists and the current position of the power receiving device 20, which were received with the above request, the direction of the power receiving element 211 is adjusted to face the direction of the transmission device 10 (S1015).

Further, the transmission device 10 adjusts the oriented direction of the transmission element 13, based on the direction α in which the power receiving device 20 positioned in S1026 exists and the current position of the power receiving device 20 (S1030).

Figure 11:
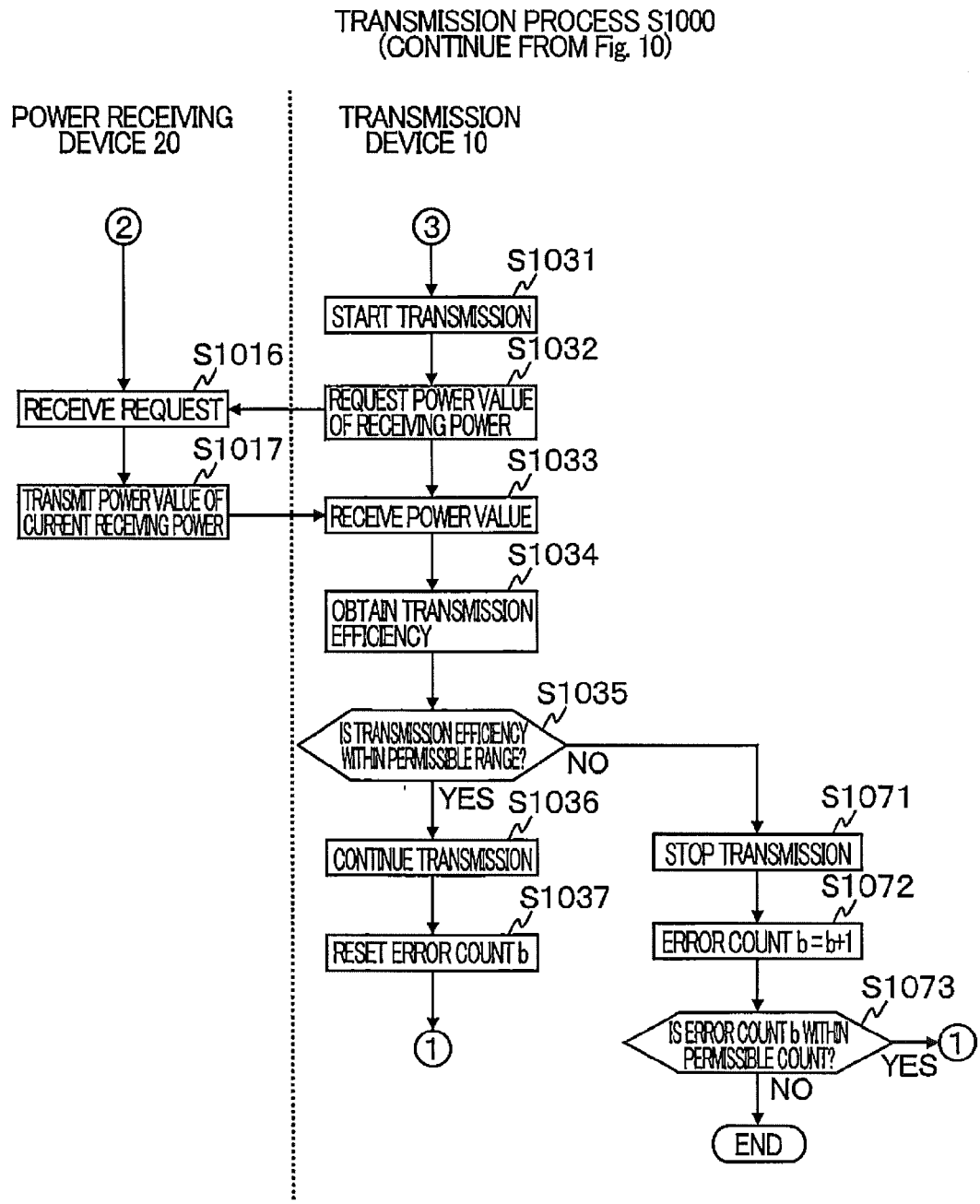
FIG. 11 is a flowchart describing a transmission process S1000 according to one or more embodiments of the invention.

Next, as shown in FIG. 11, the transmission device 10 starts transmission of transmission power to the power receiving device 20 (S1031). After starting transmitting of the transmission power, the transmission device 10 obtains transmission efficiency of the transmission power, and decides whether or not the obtained transmission efficiency deviates from the permissible range obtained in S1028.

In other words, as shown in the drawing, first the transmission device 10 transmits to the power receiving device 20 a request to transmit a power value (hereinbelow, referred to as a power value transmitting request) of power that is currently being received from the transmission device 10 (hereinbelow, also referred to as receiving power) (S1032).

When the power receiving device 20 receives the power value transmitting request (S1016), the power receiving device 20 acquires the power value of the current receiving power, and transmits the acquired power value to the transmission device 10 (S1017).

When the transmission device 10 receives the receiving power from the power receiving device 20 (S1033), the transmission device 10 acquires the power value of the transmission power currently transmitted from the transmission element 13 by itself, and based on the above and the power value of the receiving power received in S1033, obtains the current transmission efficiency (S1034).

Next, the transmission device decides whether or not the obtained current transmission efficiency is within the permissible range obtained in S1028 (S1035). When the obtained current transmission efficiency is within the permissible range (S1035:YES), transmission to the power receiving device 20 is continued (S1036), and the error count b is reset (S1037). Then, the process from S1022 is repeated.

On the other hand, when the current transmission efficiency is outside the permissible range (S1035:NO), the transmission device 10 stops transmission to the power receiving device 20 (S1071), and adds 1 to the error count b (S1072). Note that, in S1071, the transmission device 10 transmits information indicating that the transmission efficiency is outside the permissible range to the power receiving device 20 and urges the user to decide whether or not transmission will be stopped, and according to the request from the user the device may control stopping of transmission/continuing of transmission.

Next, the transmission device 10 decides whether or not the error count b exceeds the permissible count (the permissible count that has been preset regarding the error count b) (S1073). In the case that the error count b does not exceed the permissible count (S1073:YES), the process returns to S1022, and transmission is restarted after the oriented directions of the transmission element 13 and the power receiving element 211 have been readjusted.

On the other hand, in the case that the error count b exceeds the permissible count (S1073:NO), the transmission device 10 stops transmission to the power receiving device 20. Thereafter, the transmission process S1000 ends.

Figure 12:
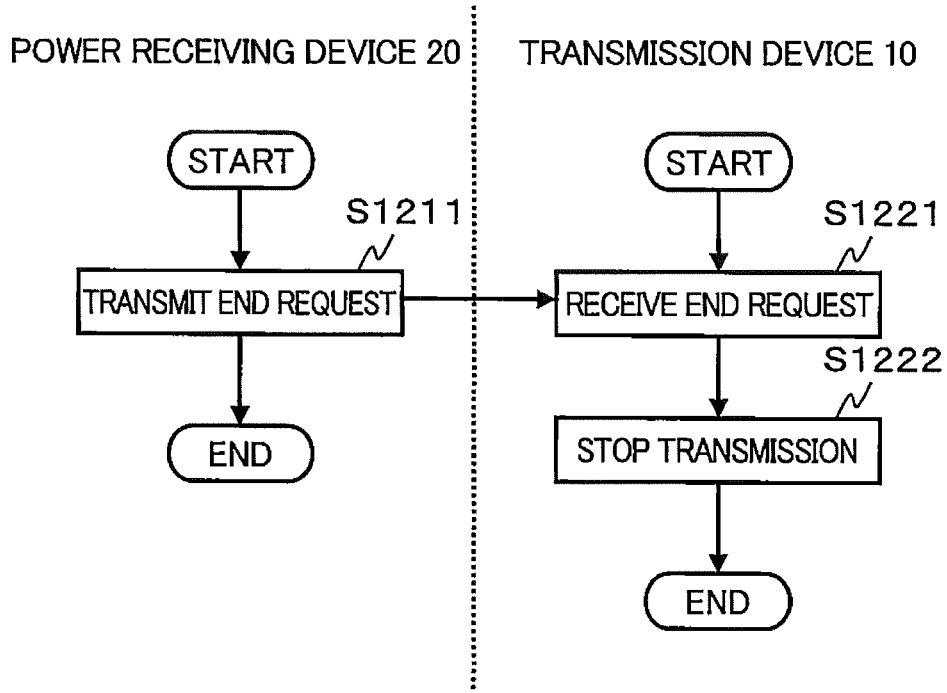
FIG. 12 is a flowchart describing an example of a process to stop transmission performed by the transmission device 10 to the power receiving device 20 according to one or more embodiments of the invention.

As shown in FIG. 12, for example, in the case that the transmission device 10 receives the transmission stop request to be transmitted from the power receiving device 20 (S1211, S1221), transmission to the power receiving device 20 can be stopped (S1222). The power receiving device 20, for example, transmits the above transmission stop request in the case that the user performs the predetermined operation to the power receiving device 20.

Figure 13:
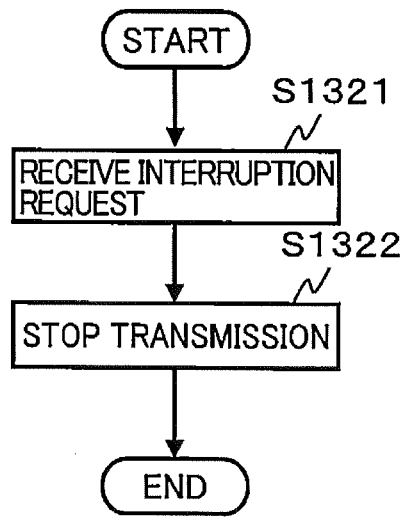
FIG. 13 is a flowchart describing an example of a process to stop transmission performed by the transmission device 10 to the power receiving device 20 according to one or more embodiments of the invention.

As shown in FIG. 13, for example, in the case that the transmission device 10 receives an instruction to end transmission to the power receiving device 20 from the user via the input device 18 (S1321), the transmission to the power receiving device 20 may be ended (S1322). In this case, only the transmission to the power receiving device 20 specified by the user may be stopped.

As described above, according to the wireless transmission system 1 in this embodiment, the transmission device 10 starts transmission by controlling so that the oriented direction of the transmission element 13 faces the direction of the power receiving device 20, based on the direction α in which the power receiving device 20 exists obtained by the positioning device 14, thus transmission from the transmission device 10 to the power receiving device 20 can be efficiently performed.

After transmission has started, the transmission device 10 obtains a permissible range of transmission efficiency that corresponds to a distance obtained with the positioning device 14 between itself and the power receiving device 20, obtains a permissible range of transmission efficiency, obtains the current transmission efficiency from the power value received from the power receiving device 20 and the power value output from the transmission element 13, in the case that the obtained transmission efficiency deviates from the permissible range the direction α is acquired again, and based on the direction α that has been acquired again, performs control so that the oriented direction of the transmission element 13 is facing the direction of the power receiving device 20. Thus, the oriented direction of the transmission element 13 can be appropriately controlled, and the transmission from the transmission device 10 to the power receiving device 20 can be efficiently and surely performed.

The transmission device 10 stops transmission in the case that the transmission efficiency deviates from the permissible range, so that inefficient transmission can be prevented. The transmission device 10 restarts transmission after adjusting the oriented directions of the transmission element 13 and the power receiving element 211, thus transmission from the transmission device 10 to the power receiving device 20 can be efficiently and surely performed.

The transmission device 10 transmits the positioning signal transmitting request during performing transmission to the power receiving device 20, subsequently in the case that the positioning device 14 did not receive the positioning signal 600 from the power receiving device 20 within a predetermined time the device 10 stops transmission to the power receiving device 20. In the case that the positioning signal 600 could not be received in this way transmission is stopped, so that transmission with a large loss can be prevented from being performed.

The transmission device 10 decides whether or not the positioned direction α is within the permissible range, and only in the case that the positioned direction α is within the permissible range, transmission to the power receiving device 20 is started. Thus, for example, a state can be prevented where even though the transmission device 10 and the power receiving device 20 are not opposed but the transmission efficiency is within the permissible range by chance and the transmission continues (transmission is to be performed in an appropriate state in which the oriented direction of both the transmission device 10 and the power receiving device 20 are adjusted.).

At the power receiving device 20 side, the oriented direction of the power receiving element 211 is adjusted to the direction of the transmission device 10, based on the positioning result sent from the transmission device, thus according to this the transmission efficiency can be improved. When necessary power needed for adjustment of the oriented direction of the power receiving element 211 is supplied from the transmission device 10 to the power receiving device 20 by wireless power transfer, so that even in the case where the power receiving device 20 does not have an accumulation capability, the oriented direction of the power receiving device 211 can be adjusted.

Note that, the above explained embodiment mode is to facilitate understanding of this invention and does not limit this invention in any way. This invention may be modified or altered without departing from the scope thereof, and of course this invention includes its equivalents.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 wireless power transfer system, 10 transmission device, 13 transmission element, 14 positioning device, 20 power receiving device, 151 oriented direction control section, 153 direction obtaining section, 154 distance obtaining section, 156 permissible range calculating section, 157 receiving power receiving section, 158 transmission efficiency calculating section, 211 power receiving element

The invention claimed is:

1. A wireless power transfer system comprising:
a power receiving device that receives transmission by wireless power transfer;
a transmission device that has a transmission element that transmits transmission power to the power receiving device, the transmission device having a control mechanism that controls an oriented direction of the transmission element;
a positioning device that is connected communicably with the transmission device, the positioning device receiving with a plurality of antennas arranged adjacent to each other a positioning signal that is a wireless signal transmitted from the power receiving device, the positioning device having a positioning function that calculates a direction α in which the power receiving device exists when seen from the positioning device itself and a position of the power receiving device, based on a phase difference between the received positioning signals, wherein
the transmission device
acquires from the positioning device a direction α in which the power receiving device exists, controls the control mechanism so that the oriented direction of the transmission element faces the direction of the power receiving device based on the acquired direction α, and starts transmission, and
acquires a distance between the transmission device itself and the power receiving device based on the position of the power receiving device acquired from the positioning device, and obtains a permissible range of transmission efficiency at the time of transmitting the transmission power to the power receiving device, which corresponds to the acquired distance,
the power receiving device transmits to the transmission device a power value that is currently being supplied from the transmission device,
the transmission device
receives the power value sent from the power receiving device,
obtains a current transmission efficiency, based on the received power value and a power value of the transmission power currently being transmitted from the transmission element, and
in the case that the current transmission efficiency deviates from the permissible range, acquires again from the positioning device a direction α in which the power receiving device exists, and based on the acquired direction α, controls the oriented direction of the transmission element so that the oriented direction of the transmission element faces the direction of the power receiving device.

2. The wireless power transfer system according to claim 1, wherein
in the case that the transmission efficiency deviates from the permissible range, the transmission device stops the transmission to the power receiving device, acquires again from the positioning device the direction α in which the power receiving device exists, performs control so that the oriented direction of the transmission element faces the direction of the power receiving device, based on the direction α in which the acquired power receiving device exists, and subsequently restarts the transmission to the power receiving device.

3. The wireless power transfer system according to claim 1, wherein
the transmission device transmits to the power receiving device a positioning signal transmitting request that is information requesting the power receiving device to transmit the positioning signal,
the positioning device performs positioning of the power receiving device based on the positioning signal that the power receiving device transmits according to the positioning signal transmitting request, and
the transmission device transmits the positioning signal transmitting request during performing the transmission to the power receiving device, and after transmitting the positioning signal transmitting request, in the case that the positioning device does not receive the positioning signal from the power receiving device within a predetermined time, the transmission device stops the transmission to the power receiving device.

4. The wireless power transfer system according to claim 1, wherein
the power receiving device includes a power receiving element that receives the transmission power and a control mechanism that controls an oriented direction of the power receiving element,
the transmission device transmits to the power receiving device the direction α in which the power receiving element exists and a position where the power receiving device exists acquired from the positioning device,
the power receiving device receives the direction α and the position, and adjusts the oriented direction of the power receiving element to a direction of the transmission device based on the received direction α and the position.

5. The wireless power transfer system according to claim 4, wherein
the transmission device supplies by wireless power transfer to the power receiving device power needed to adjust the oriented direction of the power receiving device.

6. A transmission device of a wireless power transfer system according to claim 1, comprising:
a transmission element that transmits the transmission power to the power receiving device; and a control mechanism that controls the oriented direction of the transmission element, wherein the transmission device acquires from the positioning device a direction α in which the power receiving device exists, controls the control mechanism so that the oriented direction of the transmission element faces the direction of the power receiving device based on the acquired direction α and starts transmission, and acquires the distance between the transmission device itself and the power receiving device based on the position of the power receiving device acquired from the positioning device, and obtains a permissible range of transmission efficiency at the time of transmitting the transmission power to the power receiving device, which corresponds to the acquired distance, receives the power value sent from the power receiving device, obtains a current transmission efficiency, based on the received power value and a power value of the transmission power currently being transmitted from the transmission element, and in the case that the current transmission efficiency deviates from the permissible range, the transmission device acquires again from the positioning device a direction α in which the power receiving device exists, and based on the acquired direction α, controls the oriented direction of the transmission element so that the oriented direction of the transmission element faces the direction of the power receiving device.

7. The transmission device according to claim 6, wherein in the case that the transmission efficiency deviates from the permissible range, the transmission device stops the transmission to the power receiving device, acquires again from the positioning device a direction α in which the power receiving device exists, performs control so that the oriented direction of the transmission element faces the direction of the power receiving device, based on the direction α in which the acquired power receiving device exists, and subsequently restarts transmission to the power receiving device.

8. A controlling method of a wireless power transfer system, the wireless power transfer system including
a power receiving device that receives transmission by wireless power transfer,
a transmission device that has a transmission element that transmits transmission power to the power receiving device, the transmission device having a control mechanism that controls an oriented direction of the transmission element,
a positioning device that is connected communicably with the transmission device, the positioning device receiving with a plurality of antennas arranged adjacent to each other a positioning signal that is a wireless signal to be transmitted from the power receiving device, the positioning device having a positioning function that calculates a direction α in which the power receiving device exists when seen from the positioning device itself and a position of the power receiving device, based on a phase difference between the received positioning signals, wherein the transmission device
acquires from the positioning device a direction α in which the power receiving device exists, controls the control mechanism so that the oriented direction of the transmission element faces the direction of the power receiving device based on the acquired direction α, and starts transmission, and acquires a distance between the transmission device itself and the power receiving device based on the position of the power receiving device acquired from the positioning device, and obtains a permissible range of transmission efficiency at the time of transmitting the transmission power to the power receiving device, which corresponds to the acquired distance, the power receiving device transmits to the transmission device a power value that is currently being supplied from the transmission device, the transmission device
receives the power value sent from the power receiving device, obtains a current transmission efficiency, based on the received power value and a power value of the transmission power currently being transmitted from the transmission element, and in the case that the current transmission efficiency deviates from the permissible range, the transmission device acquires again from the positioning device a direction α in which the power receiving device exists, and based on the acquired direction α, controls the oriented direction of the transmission element so that the oriented direction of the transmission element faces the direction of the power receiving device.

9. A controlling method of a wireless power transfer system according to claim 8, wherein, in the case that the transmission efficiency deviates from the permissible range, the transmission device stops the transmission to the power receiving device, acquires again from the positioning device a direction α in which the power receiving device exists, performs control so that an oriented direction of the transmission element faces the direction of the power receiving device, based on the direction α in which the acquired power receiving device exists, and subsequently restarts the transmission to the power receiving device.

* * * * *